(12) United States Patent
Arditti et al.

(10) Patent No.: US 8,495,351 B2
(45) Date of Patent: *Jul. 23, 2013

(54) PREPARING AND PRESERVING A SYSTEM CONFIGURATION DURING A HOT UPGRADE

(75) Inventors: Kanael Arditti, Tel Aviv (IL); Liran Zvibel, Tel Aviv (IL)

(73) Assignee: International Business Machines Corporation, Armonk, NY (US)

(*) Notice: Subject to any disclaimer, the term of this patent is extended or adjusted under 35 U.S.C. 154(b) by 367 days.

This patent is subject to a terminal disclaimer.

(21) Appl. No.: 12/903,857

(22) Filed: Oct. 13, 2010

(65) Prior Publication Data

US 2012/0096252 A1    Apr. 19, 2012

(51) Int. Cl.
*G06F 9/00* (2006.01)
*G06F 9/24* (2006.01)
*G06F 11/00* (2006.01)

(52) U.S. Cl.
USPC ...................... 713/2; 713/1; 714/15

(58) Field of Classification Search
USPC .................. 713/1, 2, 100
See application file for complete search history.

(56) References Cited

U.S. PATENT DOCUMENTS

| | | | | |
|---|---|---|---|---|
| 6,393,560 | B1* | 5/2002 | Merrill et al. | 713/2 |
| 7,107,443 | B2* | 9/2006 | Rhoades | 713/1 |
| 7,523,344 | B2* | 4/2009 | Qiao et al. | 714/6.32 |
| 8,239,667 | B2* | 8/2012 | Durham | 713/100 |
| 2002/0095527 | A1* | 7/2002 | Shizuka et al. | 709/327 |
| 2005/0036443 | A1 | 2/2005 | Collins | |
| 2005/0125650 | A1 | 6/2005 | Chen et al. | |
| 2008/0282239 | A1 | 11/2008 | Borlick et al. | |
| 2008/0301663 | A1 | 12/2008 | Bahat et al. | |
| 2009/0132799 | A1 | 5/2009 | Brumley et al. | |
| 2011/0003590 | A1* | 1/2011 | Yoon et al. | 455/432.1 |
| 2012/0042156 | A1* | 2/2012 | Ma et al. | 713/2 |

FOREIGN PATENT DOCUMENTS

| | | |
|---|---|---|
| CN | 1928821 | 3/2007 |
| CN | 101178659 | 5/2008 |
| DE | 10148605 | 4/2003 |
| TW | 200805145 | 1/2008 |

OTHER PUBLICATIONS

Hariprasad Nellitheertha, Reboot Linux faster using kexec, May 4, 2004, pp. 10.*
Muehlbach A. et al., "Concurrent Driver Upgrade: Method to Eliminate Scheduled System Outages for New Function Releases", IBM journal of research and development ISSN 0018-8646 CODEN IBMJAE. 2007, vol. 51, No. 1-2 (244 p.) [Document : 9 p.] (6 ref.), pp. 185-193 [9 page(s) (article)]. URL:http://cs.dialog.com/client/csc_qj151/.

* cited by examiner

*Primary Examiner* — Suresh Suryawanshi
(74) *Attorney, Agent, or Firm* — Griffiths & Seaton PLLC

(57) ABSTRACT

A planned system configuration is stored to a volatile memory coupled to a processor executing a first operating system kernel. The planned system configuration is tagged. A boot of a second operating system kernel is initiated while preserving in the volatile memory contents stored therein, and following the boot of the second operating system kernel, a set of parameters referencing the tagged planned system configuration is retrieved from the volatile memory. The planned system configuration is then used, based on the retrieved set of parameters.

25 Claims, 4 Drawing Sheets

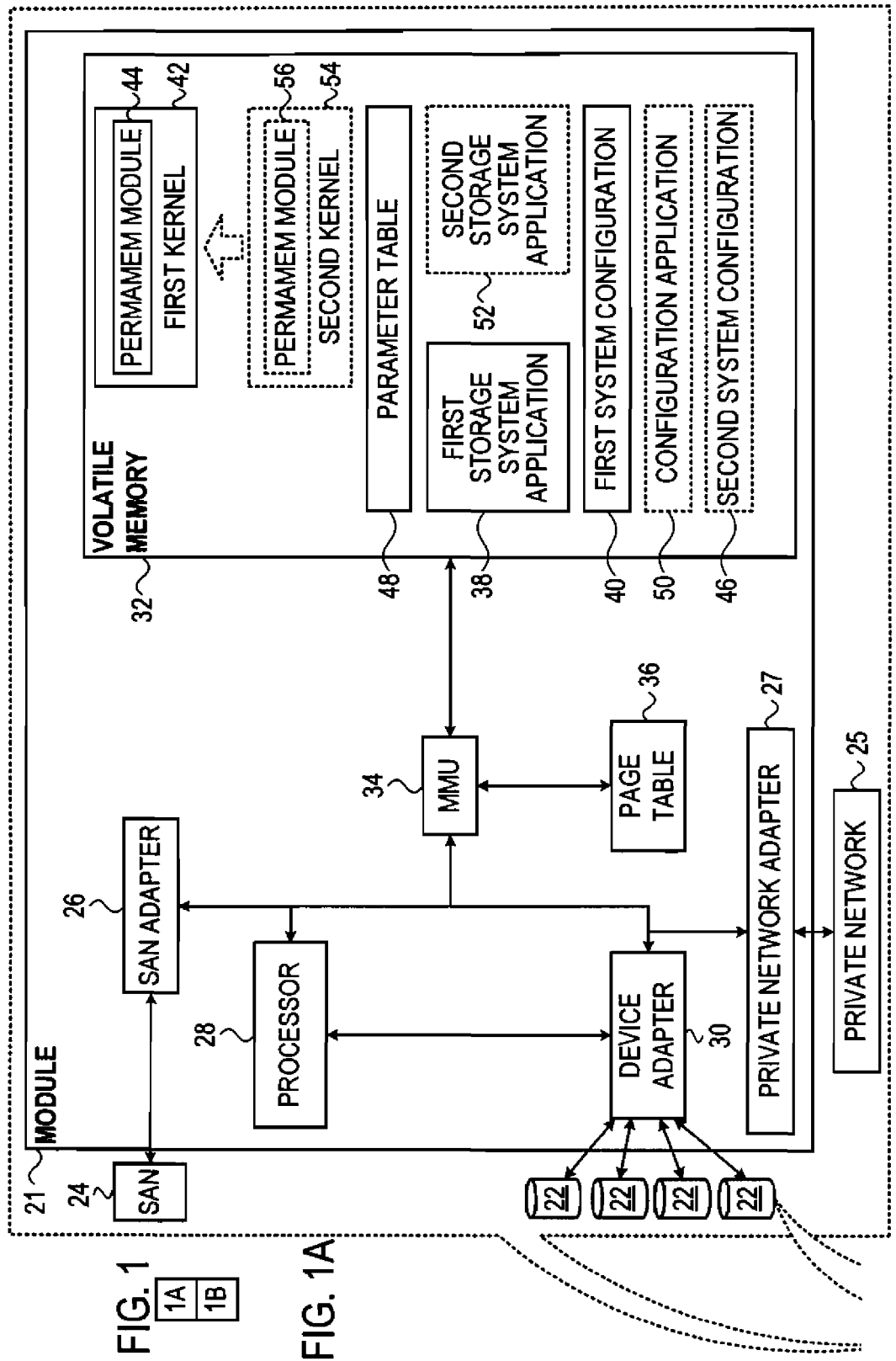

PREPARING AND PRESERVING A SYSTEM CONFIGURATION DURING A HOT UPGRADE

CROSS-REFERENCE TO RELATED APPLICATIONS

This application is related to U.S. patent applications titled "Memory Tagging and Preservation During a Hot Upgrade" and "Port Throttling Across an Operating System Restart During a Hot Upgrade" filed on even date with the present application, and which are incorporated herein by reference.

FIELD OF THE INVENTION

The present invention relates generally to a software upgrade for a computer appliance, and specifically to preparing and preserving an updated system configuration across an operating system restart during a hot upgrade.

BACKGROUND OF THE INVENTION

Operating systems manage the way software applications utilize the hardware of computer systems, such as storage controllers. A fundamental component of operating systems is the operating system kernel (also referred to herein as a "kernel"), which provides secure computer system hardware access to software applications executing on the computer system. Since accessing the hardware can be complex, kernels may implement a set of hardware abstractions to provide a clean and uniform interface to the underlying hardware. The abstractions provided by the kernel provide software developers easier access to the hardware when writing software applications.

Two common techniques for rebooting (i.e. restarting) an operating system are a "cold boot" and a "warm boot". During a cold boot, power to a computer system's volatile memory is cycled (i.e., turned off and then turned on), and the operating system is rebooted. Since power is cut off to the memory, any contents (i.e., software applications and data) stored in the memory prior to the cold boot are lost. During a warm boot, the operating system reboots while power is still applied to the volatile memory, thereby preserving the contents stored in the volatile memory.

In addition to a warm boot and a cold boot, the Linux operating system offers a method of rapidly booting a new operating system kernel via the kexec function. The kexec function first loads a new kernel into memory and then immediately starts executing the new kernel.

SUMMARY OF THE INVENTION

An embodiment of the present invention provides a method, including storing, to a volatile memory coupled to a processor executing a first operating system kernel, a planned system configuration, tagging the planned system configuration, initiating a boot of a second operating system kernel while preserving in the volatile memory contents stored therein, retrieving, following the boot of the second operating system kernel, a set of parameters referencing the tagged planned system configuration from the volatile memory, and using the planned system configuration, based on the retrieved set of parameters.

There is also provided, in accordance with an embodiment of the present invention, an apparatus, including a volatile memory, and a processor configured to execute a first operating system kernel and store a planned system configuration to a volatile memory coupled to the processor, to tag the planned system configuration, to initiate a boot of a second operating system kernel while preserving in the volatile memory contents stored therein, to retrieve, following the boot of the second operating system kernel, a set of parameters referencing the tagged planned system configuration from the volatile memory, and to use the planned system configuration, based on the retrieved set of parameters.

There is further provided, in accordance with an embodiment of the present invention, a computer program product including a non-transitory computer readable storage medium having computer readable program code embodied therewith, the computer readable program code including computer readable program code configured to tag the planned system configuration, computer readable program code configured to store to the volatile memory, a set of parameters referencing the planned system configuration, computer readable program code configured to initiate a boot of a second operating system kernel while preserving in the volatile memory contents stored therein, computer readable program code configured to retrieve, following the boot of the second operating system kernel, a set of parameters referencing the tagged planned system configuration from the volatile memory, and computer readable program code configured to use the planned system configuration, based on the retrieved set of parameters.

BRIEF DESCRIPTION OF THE DRAWINGS

The disclosure is herein described, by way of example only, with reference to the accompanying drawings, wherein:

FIGS. 1A and 1B, referred to collectively as FIG. 1, are a schematic pictorial illustration of a storage controller implementing system configuration preparation and preservation, in accordance with an embodiment of the present invention;

DETAILED DESCRIPTION OF EMBODIMENTS

Overview

Figure 1B:
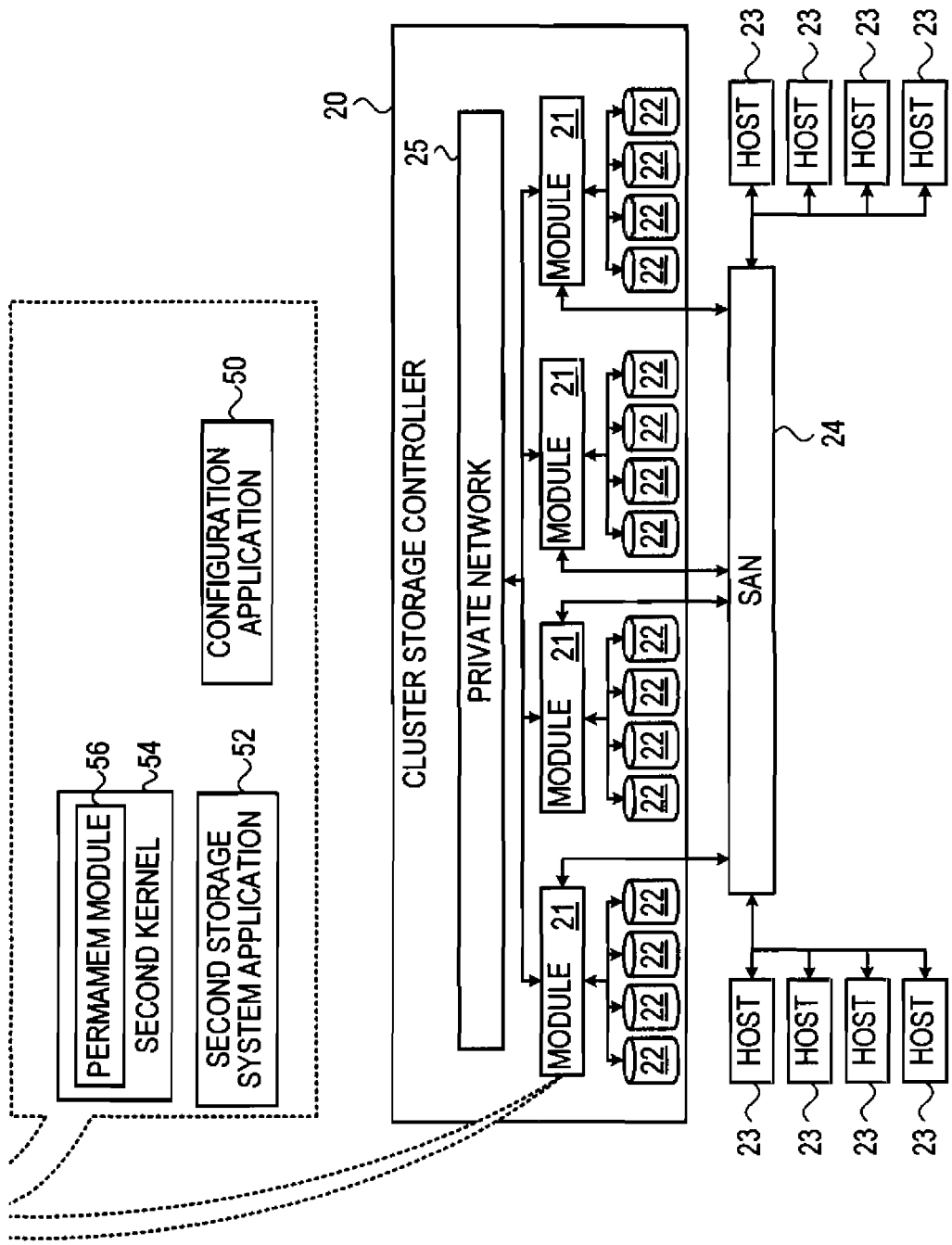

There may be instances when a storage controller administrator (i.e., the individual administering a storage controller) needs to upgrade computer programs executing on the storage controller. Examples of computer programs executing on the storage controller include an operating system kernel (of an operating system such as Linux), and a storage system application. The storage system application manages storage controller operations such as storage volume maintenance, thin provisioning and data replication (e.g., mirroring). The storage system application executes "on top" of the operating system kernel in the sense that the kernel provides a set of services and libraries for the storage system application to interact with the kernel, the storage controller hardware components (e.g., volatile memory and disk drives), as well as any other computer programs executing on the storage controller.

Given the variety of software executing on a storage controller, it may be sometimes preferable to a hot upgrade (i.e., upgrading computer programs executing on the storage controller while the storage controller is in operation)

for multiple software applications simultaneously (e.g., upgrading the operating system kernel at the same time as upgrading the storage system application). When performing the hot upgrade, it may be necessary to update a system configuration for the storage system application when upgrading the storage system application. The system configuration stores information about the storage controller and the storage system application, and is typically stored in an Extensible Markup Language (XML) file. Examples of information stored in a system configuration for a storage controller system include (a) the number of hard disks, (b) the serial numbers of the hard disks, (c) the number of processors installed in the storage controller, (d) the number of active volumes, (e) type and size of each volume, (f) the number of cables, (g) the state of each cable, and (h) the number of stored snapshots.

Embodiments of the present invention provide methods and systems for creating an updated system configuration, and tagging and preserving a memory region storing the updated system configuration during a hot upgrade of a computer appliance such as a storage controller. Preserving the updated system configuration enables the storage controller operator to upgrade the operating system kernel and software applications without interruption to in-flight I/O operations. Tagging and preserving memory regions across system software upgrades is described in the U.S. patent application entitled "Memory Tagging and Preservation During a Hot Upgrade" referenced above.

In some embodiments, while the storage controller is executing a first storage system application on top of a first operating system kernel and using a first system configuration, a configuration application creates a second, typically an updated, system configuration which is stored to a specific region in the storage controller's volatile memory. A set of parameters defining the specific memory region is then stored to a parameter table in the volatile memory, while still operating under the first operating system kernel. After booting a second operating system kernel, the second kernel executes a second storage system application which loads the set of parameters from the parameter table and establishes addressability to the memory region storing the second system configuration. Once addressability is established to the preserved memory regions, the second storage system application is able to address the contents of the preserved (i.e., tagged) second system configuration, and the storage controller can then proceed to process new I/O requests.

System Description

FIG. 1 is a schematic pictorial illustration of a clustered storage controller 20 operative to perform system configuration preparation and preservation, in accordance with an embodiment of the present invention. In the implementation shown in the figures, clustered controller 20 comprises a plurality of generally similar modules 21. For simplicity, only one such module is shown in the figures. Each module 21 processes I/O requests (i.e., commands to read or write data at logical addresses on logical volumes) from one or more host computers 23 coupled to a storage area network (SAN) 24. Each module 21 manages a number of storage devices 22, and is coupled to SAN 24 via a hardware SAN adapter 26. Examples of SAN adapters include Fibre Channel (FC) adapters and Internet Small Computer System Interface (iSCSI) adapters. Within clustered storage controller 20, each module 21 is also coupled to a private network 25 via a private network adapter 27. Private network 25 enables modules 21 in clustered storage controller 20 to communicate with one another.

While the description herein relates generally to a clustered storage controller, it will be understood that embodiments of the present invention may also be used for a non-clustered storage controller, and those having ordinary skill in the art will be able to adapt the description, mutatis mutandis, to apply to a non-clustered storage controller.

A processor 28 processes the I/O request, transfers data from/to storage devices 22 (e.g., a hard disk or a solid state drive) via a device adapter 30, and conveys the result of the I/O request (e.g., an acknowledgement of a write operation, or the retrieved data of a read operation) to the host computer over SAN 24 via SAN adapter 26. Examples of device adapters include International Business Machines (IBM) ServeRAID™ M5000 series adapters, which implement both Serial Advance Technology Attachment (SATA) and Serial Attached SCSI (SAS) computer bus interfaces. Storage devices 22 typically comprise a combination of high capacity hard disk drives and solid state disk drives.

Processor 28 typically comprises one or more general-purpose computers configured to carry out the functions described herein. The software may be downloaded to a volatile memory 32 in electronic form, over a network, for example, or it may be provided on non-transitory tangible media, such as optical, magnetic or electronic memory media. Alternatively, some or all of the functions of processor 28 may be carried out by dedicated or programmable digital hardware components, or by using a combination of hardware and software elements.

SAN adapter 26, processor 28 and device adapter 30 access volatile memory 32 via a memory management unit (MMU) 34, which performs virtual memory management by translating virtual addresses (i.e., referenced by the SAN adapter, the processor and the device adapter) to their corresponding physical addresses (i.e., in volatile memory 32). The mapping relationship between the physical addresses and the virtual addresses is stored in a page table 36. In addition to mapping virtual addresses to their corresponding physical addresses, page table 36 enables MMU 34 to present a combination of non-contiguous regions in volatile memory 32 as a single contiguous virtual memory region.

Initially, processor 28 executes a first storage system application 38, which accesses a first system configuration 40. First storage system application 38 executes on top of a first operating system kernel 42 stored in a particular address in volatile memory 32. First operating system kernel 42 comprises a permamem module 44 (a software module) configured to identify a set of parameters referencing a second system configuration 46, and store the set of parameters to a parameter table 48. Processor 28 uses, inter alia, second system configuration 46 to enable a software upgrade for controller 20.

Second system configuration 46 is created by a configuration application 50. Second system configuration 46 is used by a second storage system application 52, typically an upgraded version of first software system application 38, which executes on top of a second operating system kernel 54 after the software upgrade.

Prior to booting second operating system kernel 54, processor 28 overwrites first operating system kernel 42 with the second kernel, so that the second kernel is now stored at the particular address in memory 32 which previously stored the first kernel. Second operating system kernel 54 comprises a permamem module 56 configured to retrieve the set of parameters stored in parameter table 48 and to enable second storage system application 52 to access second system configuration 46. Permamem modules 44, 56 and parameter table 48 are described in further detail hereinbelow.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

System Configuration Preparation and Tagging

Figure 2:
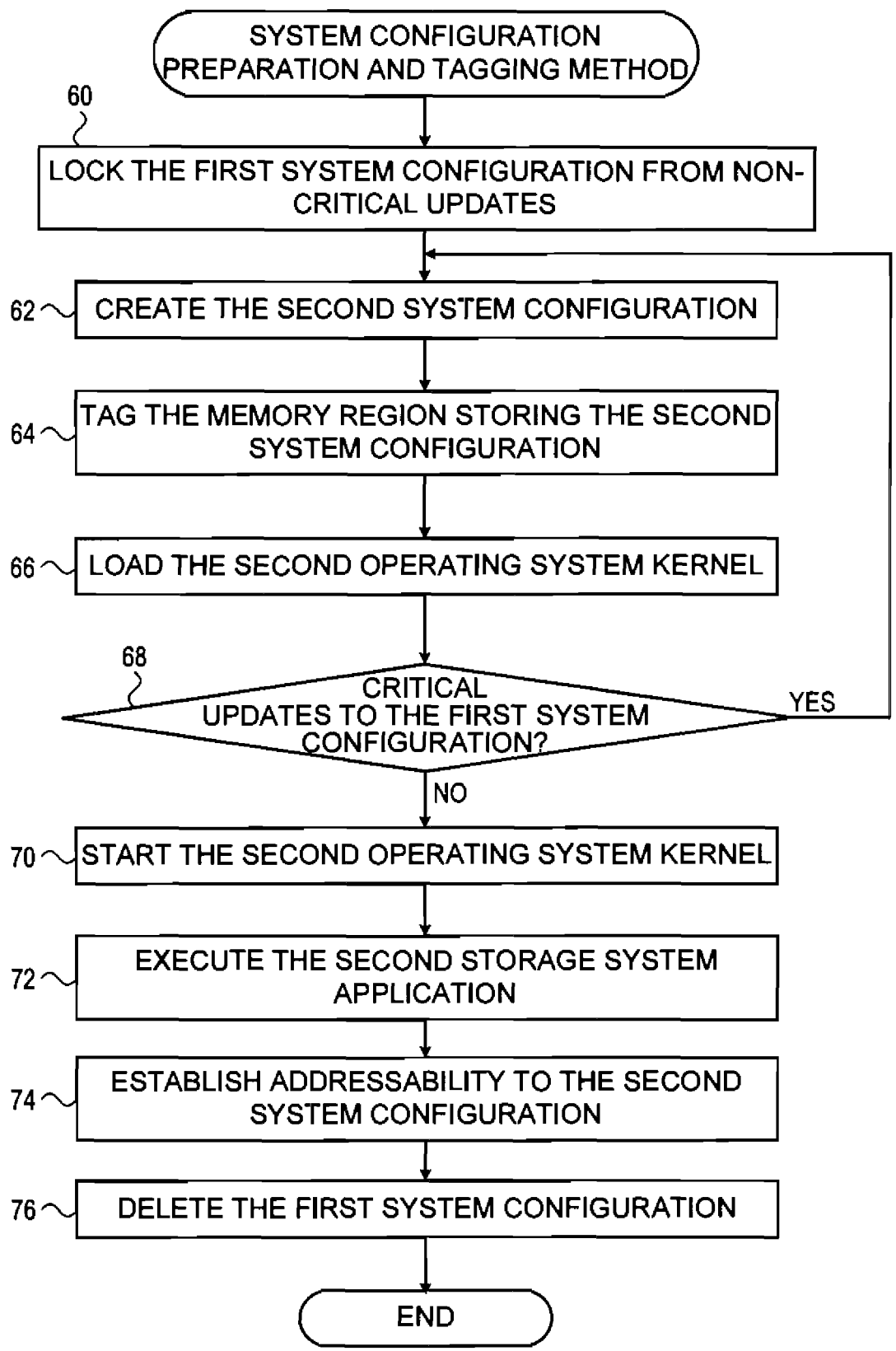
FIG. 2 is a flow diagram that schematically illustrates a system configuration preparation and preservation method, in accordance with an embodiment of the present invention.

FIG. 2 is a flow diagram that schematically illustrates a system configuration preparation and preservation method during a hot upgrade, in accordance with an embodiment of the present invention. In an initial step 60, processor 28, executing first storage system application 38 on top of first operating system kernel 42, locks the first system configuration from any non-critical updates while allowing critical updates to the first system configuration. In operation, first storage system application 38 (also referred to herein as a previous storage system application) accesses and updates first system configuration 40 (also referred to herein as a previous system configuration).

Examples of critical updates include a hard disk failure and a deletion of a snapshot due to a space constraint. Examples of non-critical updates include resizing a volume and adding new hardware to storage controller 20. Typically, a manufacturer of storage controller 20 defines which types of updates are critical and which are non-critical.

After locking first system configuration 40, in a configuration creation step 62, processor 28 executes configuration application 50 to create second system configuration 46 (also referred to herein as a planned system configuration) which the configuration application stores in volatile memory 32. Note that processor 28 is executing the previous storage system application over the first operating system kernel at a time prior to the configuration application creating and storing the second system configuration.

While creating second system configuration 46, processor 28 is executing first storage system application 38, which accesses and updates first system configuration 40, which is based on an original data model (a data model comprises descriptions and attributes of fields and objects). Second system configuration 46 is typically based on a revised data model than the original data model used for first system configuration 40. For example, the second system configuration may support new features (i.e., of the second storage system application), properties and hardware components.

Configuration application 50 comprises multiple transformation functions which transform (i.e., update) original fields and objects in first system configuration 40 to transformed fields and objects for use by second storage system application 52 (and appropriate for the revised data model). Configuration application 50 may load the revised data model from an XML file stored on one of storage devices 22. Examples of changes to the revised data model used by second system configuration 46 may include:

- Addition of new fields and/or objects. For example, first system configuration 40 may support Unix volumes and Windows™ volumes, while second system configuration 46 may add support for mainframe volumes. Since there are no mainframe volumes in the first system configuration, configuration application 50 adds the attribute mainframe_volume for each of the volumes in the first system configuration. When creating second system configuration 46, configuration application 50 sets the default value of mainframe_volume to False, since there were no mainframe volumes in first system configuration 40.
- Deletion of obsolete fields and/or objects. For example, if a specific type of SAN adapter is not supported by the second storage system application, configuration application 50 removes any fields or parameters in the second system configuration which reference the SAN adapter type no longer supported.
- Fields that require specific processing and transformation. For example, if priorities are defined from 1 through 10 in the first system configuration and from 1 through 100 in the second system configuration, then the configuration application may multiply the priority values of the first system configuration by 10 when creating the second system configuration.
- Changes of default values. For example, the default memory allocation size may change from X in the first system configuration to Y in the second system configuration. The configuration application updates the second system configuration to make sure that entries using the default memory allocation are updated with the new default value.

Some of the changes to the revised data model may not require transformation in order to be used by second storage system application 52 (also referred to herein as a subsequent storage system application). For example, the addition and deletion of fields and objects described supra can be effected without a transformation function.

In a tag configuration step 64, processor 28 tags second system configuration 46, so that the second system configuration can be preserved during the course of the hot upgrade. When tagging second system configuration 46, processor 28 first identifies virtual memory addresses for the second system configuration, and then (via MMU 34 and page table 36) identifies physical memory addresses in memory 32 associated with the second system configuration. In addition, Processor 28 may also tag first system configuration 40 as a precautionary step. Tagging the first system configuration enables processor 28 to "roll back" the software upgrade in the event of a failure at any point during the upgrade. Alternatively, first system configuration 40 may have been tagged when it was originally created, or at any time prior to step 64. The tagging implemented in step 64 is described in more detail in U.S. patent application "Tagging and Preservation During a Hot Upgrade" referenced above.

After identifying the physical memory addresses for the second system configuration, processor 28 stores a set of parameters for the second system configuration to an entry in parameter table 48. The set of parameters references the second system configuration, and comprises elements which includes information such as (a) a name identifying the memory region storing second system configuration 46, (b) a size (i.e., the number of bytes), (c) a virtual memory address, (d) a physical memory address, and (e) a memory type, indicating whether the tagged memory region is restricted to a kernel space comprising memory regions reserved for kernel 42 and kernel 54 or to a user space e.g., memory regions for second system configuration 46, that are used by user applications. Since second system configuration 46 may include more than one physical memory region, the set of parameters stored in parameter table 48 may include sets of parameters for "anchors", which are multiple physical memory regions that comprise the contiguous virtual memory region (i.e., of the second system configuration).

If second operating system kernel 54 is executed via the kexec function, then in a kernel load step 66, processor 28 loads the second operating system kernel from storage device 22 to memory 32. Alternatively, processor 28 stores second operating system kernel 54 to a boot partition of storage device 22 to prepare for a warm boot of the second operating system kernel.

In a comparison step 68, if there were any critical updates (e.g., a hard disk failure) to first system configuration 40 since step 60, then the second system configuration may need to be rebuilt, and the method returns to step 62. If, however, there were no critical updates to first system configuration 40, then in a kernel boot step 70, processor 28 calls the kexec function, which first overwrites kernel 42 with kernel 54 (i.e., in the volatile memory), and then starts executing the second operating system kernel. Alternatively, if the kernel start is via a warm boot, then processor 28 initiates a warm boot by first loading second operating system 54 from the boot partition of storage device 22 to volatile memory 32, and then starts the second operating system kernel. Since power is applied to volatile memory 32 while starting the second operating system kernel (i.e., via either the execution of the kexec function or the warm boot), contents stored in the volatile memory (including the parameter table and the second system configuration) are preserved during the transition from first kernel 42 to second kernel 54.

Following start of second kernel 54, in an application start step 72, processor 28 loads second storage system application 52 from storage device 22 where it has been previously stored, and the processor then starts executing the second storage system application. While the configuration of storage devices 22 shown in FIG. 1 shows the one of the storage devices 22 storing second kernel 54, second storage system application 52 and configuration application 50 (i.e., the computer programs and the configuration used by storage controller 20 after the hot upgrade), the storage devices typically store many computer programs and data files used by the modules of the storage controller.

In an establish addressability step 74, processor 28 establishes addressability to second system configuration 46. To establish addressability, second system application 52 determines that it was started after a hot upgrade, and then retrieves the set of parameters associated with second system configuration 46 from parameter table 48. To retrieve the set of parameters, second storage system application 52 calls one or more functions in permamem module 56. For example, a function tagmem_reg_get_by_name returns a pointer to the region in memory 32 associated with a name (e.g., "configuration") which is passed to the function as a parameter. Processor 28 can then call Linux kernel function reserve_bootmem, to reserve an address range in virtual memory (i.e., in volatile memory 32) referenced by the retrieved parameters.

Function tagmem_reg_get_by_name, and additional functions used by processor 28 to tagging and preserve memory regions described in the U.S. patent application entitled "Memory Tagging and Preservation During a Hot Upgrade" referenced above.

After establishing addressability to the second system configuration, the second storage system application can then to use the second system configuration by accessing and updating the values stored in the second system configuration as needed. Finally, once the second operating system kernel and the second storage system application are loaded and executing successfully, processor 28, in a clean-up step 76, deletes first system configuration 40 from volatile memory 32.

Figure 3:
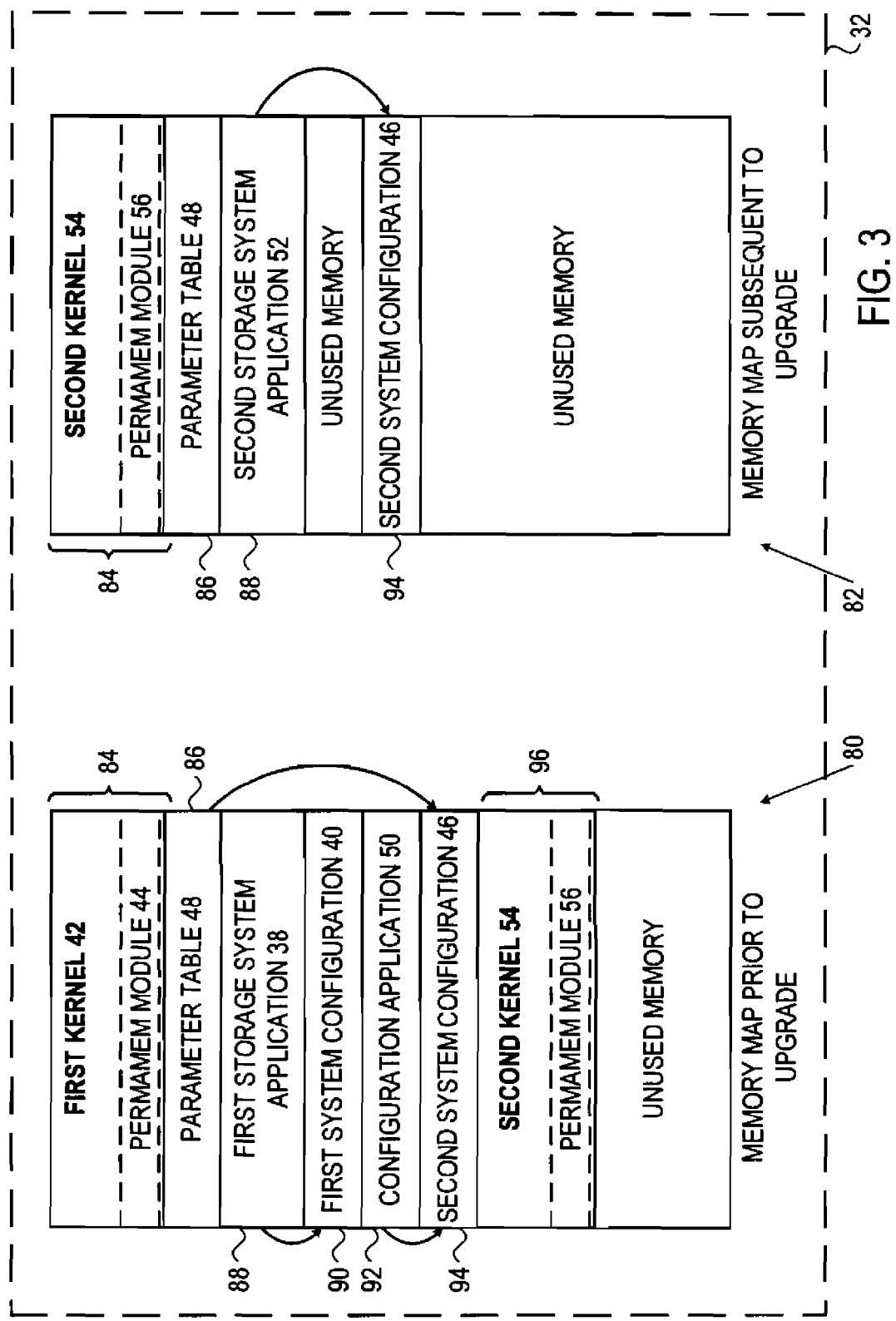
FIG. 3 is a block diagram that schematically illustrates memory maps of a volatile memory of a storage controller implementing system configuration preparation and preservation, in accordance with an embodiment of the present invention.

FIG. 3 is a block diagram that schematically illustrates a memory map 80 of volatile memory 32 prior to step 70 of the flow diagram of FIG. 2, and a memory map 82 of the volatile memory upon completing the process of the flow diagram. Prior to step 70, first kernel 42, including permamem module 44, is stored in a memory region 84. Permamem module 44 comprises functions managing parameter table 48, which is stored in a memory region 86. In addition to first kernel 42, processor 28 is also executing (i.e., prior to step 70) first storage system application 38, which is stored in a memory region 88. In operation, first storage system application 27 accesses first system configuration 40, which is stored in a memory region 90.

Configuration application 50, is stored in a memory region 92, and is configured to create second system configuration 46 which is stored in a memory region 94. During step 64, CPU 28 stores an entry in parameter table 48 comprising a pointer to memory region 94. In step 66 processor 28 loads second kernel 54 (including permamem module 56) to a memory region 96, and prior to starting (via the kexec function) the second kernel in step 70, processor 28 overwrites first kernel 42 in memory region 84 with the second kernel During step 70, processor 28 loads second storage system application 52 to memory region 88 (or any unused region of volatile memory 32) and starts executing the second storage system application. In step 74, second storage system application 52 establishes addressability to memory region 94 which stores second system configuration 46. After establishing addressability, processor 28, executing the second storage system application, can access and update the second system configuration.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An apparatus, comprising:
   a volatile memory comprising a first operating system kernel; and
   a processor coupled to the volatile memory, wherein, when executing the first operating system kernel, the processor is configured for:
      executing a first storage system application for accessing and updating a current system configuration on top of a first operating system kernel,
      locking the current system configuration from performing non-critical updates,
      creating a second storage system application for accessing and updating a subsequent system configuration on top of a second operating system kernel while executing the first storage system application,
      storing, to the volatile memory, the subsequent system configuration,
      tagging the subsequent system configuration,
      initiating a boot of the second operating system kernel while preserving in the volatile memory contents stored therein,
      retrieving, following the boot of the second operating system kernel, a set of parameters referencing the tagged subsequent system configuration from the volatile memory, and
      executing the second storage system application to use the subsequent system configuration based on the retrieved set of parameters.

2. The apparatus according to claim 1, wherein the processor is configured for initiating the boot by performing a hot upgrade of a computer appliance.

3. The apparatus according to claim 2, wherein the computer appliance comprises a storage controller.

4. The apparatus according to claim 1, wherein the processor is configured for tagging the volatile memory region by identifying the set of parameters referencing the subsequent system configuration, and storing, to the volatile memory, the set of parameters.

5. The apparatus according to claim 1, wherein the processor is configured, at a time prior to storing the subsequent system configuration, for accessing and updating, by a previous storage system application executing on top of the first kernel, a first plurality of original fields and objects stored in a previous system configuration.

6. The apparatus according to claim 5, wherein the processor is configured for transforming the first plurality of original fields and objects to a second plurality of transformed fields and objects for use by a subsequent storage system application, thereby creating the subsequent system configuration.

7. The apparatus according to claim 1, wherein the processor is configured for using the subsequent system configuration by accessing and updating, by the subsequent storage system application executing on top of the second operating system kernel, the second plurality of transformed fields and objects.

8. The apparatus according to claim 1, wherein the processor is configured for selecting each of the parameters from a group consisting of a name, a size, a virtual memory address, a physical memory address and a memory type.

9. The apparatus according to claim 8, wherein the set of parameters comprises an entry in a parameter table stored in the volatile memory.

10. The apparatus according to claim 1, wherein the processor is configured for storing the first operating system at a first address in the volatile memory, and wherein the processor is further configured for initiating the boot of the second operating system kernel by loading the second kernel to the volatile memory to a second address in the virtual memory, copying the second operating system kernel from the second address to the first address, and starting the second kernel.

11. The apparatus according to claim 1, wherein the processor is configured for initiating the boot of the second operating system kernel by storing the second kernel to a boot partition of a storage device coupled to the processor, and initiating a warm boot of the second operating system kernel from the boot partition.

12. A computer program product, the computer program product comprising a non-transitory computer readable memory including computer readable program code embodied therewith, the computer readable program code comprising:
   computer readable program code configured for executing a first storage system application for accessing and updating a current system configuration on top of a first operating system kernel;
   computer readable program code configured for locking the current system configuration from performing non-critical updates;
   computer readable program code configured for creating a second storage system application for accessing and updating a subsequent system configuration on top of a second operating system kernel while executing the first storage system application;
   storing, to a volatile memory, the subsequent system configuration;
   computer readable program code configured for tagging the subsequent system configuration;
   computer readable program code configured for storing a set of parameters referencing the subsequent system configuration;
   computer readable program code configured for initiating a boot of the second operating system kernel while preserving in the volatile memory contents stored therein;
   computer readable program code configured for retrieving, following the boot of the second operating system kernel, a set of parameters referencing the tagged subsequent system configuration from the volatile memory; and
   computer readable program code configured for using the subsequent system configuration based on the retrieved set of parameters.

13. The computer program product according to claim 12, wherein the computer readable program code is configured for tagging the volatile memory by identifying the set of parameters referencing the subsequent system configuration and storing, to the volatile memory, the set of parameters.

14. The computer program product according to claim 12, further comprising, at a time prior to storing the subsequent system configuration, computer readable program code configured for transforming a first plurality of original fields and objects for use by a previous storage system application to a second plurality of transformed fields and objects for use by a subsequent storage system application, thereby creating the subsequent system configuration.

15. The apparatus according to claim 1, wherein the processor is further configured for allowing critical updates to the current system configuration while the current system configuration is locked from performing the non-critical updates.

16. The apparatus according to claim 1, wherein, when creating the second storage system application, the processor is further configured for performing a transformation function on fields or objects in the first storage system application.

17. The apparatus according to claim 16, wherein, when performing the transformation function the processor is further configured for adding a new field or a new object to the first storage system application.

18. The apparatus according to claim 16, wherein, when performing the transformation function the processor is further configured for deleting a field or an object from the first storage system application.

19. The apparatus according to claim 16, wherein, when performing the transformation function the processor is further configured for changing a priority value to a field or object in the first storage system application.

20. The apparatus according to claim 19, wherein, when changing the priority value, the processor is further configured for multiplying the priority value by a predetermined amount.

21. The apparatus according to claim 16, wherein, when performing the transformation function the processor is further configured for changing a default value to a field or object in the first storage system application.

22. The computer program product according to claim 12, further comprising computer readable program code configured for allowing critical updates to the current system configuration while the current system configuration is locked from performing the non-critical updates.

23. The computer program product according to claim 12, wherein the computer readable program code configured for creating the second storage system application comprises computer readable program code configured for performing a transformation function on fields or objects in the first storage system application.

24. The computer program product according to claim 23, wherein the computer readable program code configured for performing the transformation function comprises one of:
   computer readable program code configured for adding a new field or a new object to the first storage system application;
   computer readable program code configured for deleting a field or an object from the first storage system application;
   computer readable program code configured for changing a priority value to a field or object in the first storage system application; and
   computer readable program code configured for changing a default value to a field or object in the first storage system application.

25. The computer program product according to claim 24, wherein the computer readable program code configured for performing the transformation function comprises the computer readable program code configured for changing the priority value and wherein the computer readable program code configured for changing the priority value comprises computer readable program code configured for multiplying the priority value by a predetermined amount.

* * * * *